United States Patent [19]

Shah

[11] Patent Number: 5,028,766

[45] Date of Patent: Jul. 2, 1991

[54] AUTOMATED RENTAL SYSTEM

[75] Inventor: Dinesh V. Shah, Tavares, Fla.

[73] Assignee: AVS, Inc., Alt. Springs, Fla.

[21] Appl. No.: 142,705

[22] Filed: Jan. 11, 1988

Related U.S. Application Data

[63] Continuation-in-part of Ser. No. 20,328, Feb. 27, 1987, abandoned.

[51] Int. Cl.[5] .................................................. G06F 7/08

[52] U.S. Cl. .................................. 235/381; 235/383; 235/385; 235/441; 360/33.1

[58] Field of Search ............... 235/375, 381, 441, 383, 235/385; 369/33, 34, 84, 19; 360/33.1

[56] References Cited

U.S. PATENT DOCUMENTS

| | | | |
|---|---|---|---|
| 3,883,856 | 5/1975 | Saito et al. | 235/441 X |
| 4,300,040 | 11/1981 | Gould et al. | 235/381 |
| 4,359,631 | 11/1982 | Lockwood et al. | 235/381 |
| 4,533,823 | 8/1985 | Vittorio | 235/462 X |
| 4,608,679 | 8/1986 | Rudy et al. | 369/34 X |
| 4,812,629 | 3/1989 | O'Neil et al. | 235/381 X |

*Primary Examiner*—David L. Trafton
*Attorney, Agent, or Firm*—MacDonald J. Wiggins

[57] ABSTRACT

An unattended automated rental system for articles such as video cassettes includes a storage unit with electrically locked bins for containing rental articles. Each bin and its article has an identification code strip. A customer terminal having a keyboard and display monitor controlled from a computer permits a customer to review available articles, reserve articles, and select articles for rental. A control module operated by the computer unlocks a selected bin. An article returned to a bin is checked by the control module for its code strip and, if correct, locks the bin. The customer terminal checks customer identification and receives payments. Remote selection terminals may be provided to permit receiving of article information and reservation of articles to be rented.

24 Claims, 16 Drawing Sheets

FIG. 10
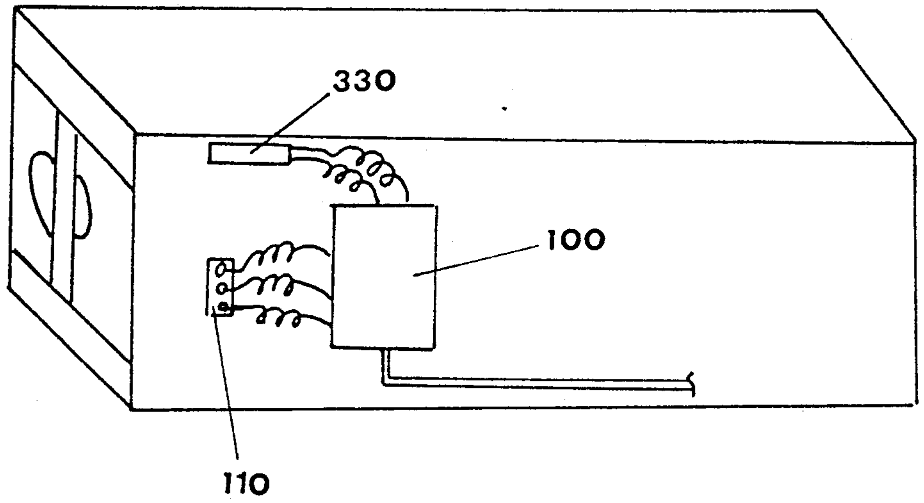
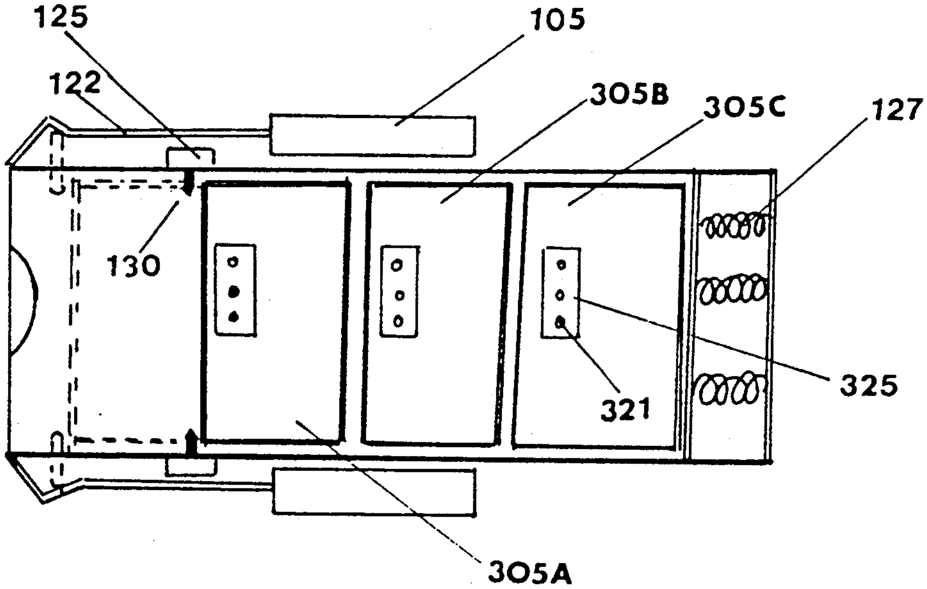
FIG. 11

FIG. 12
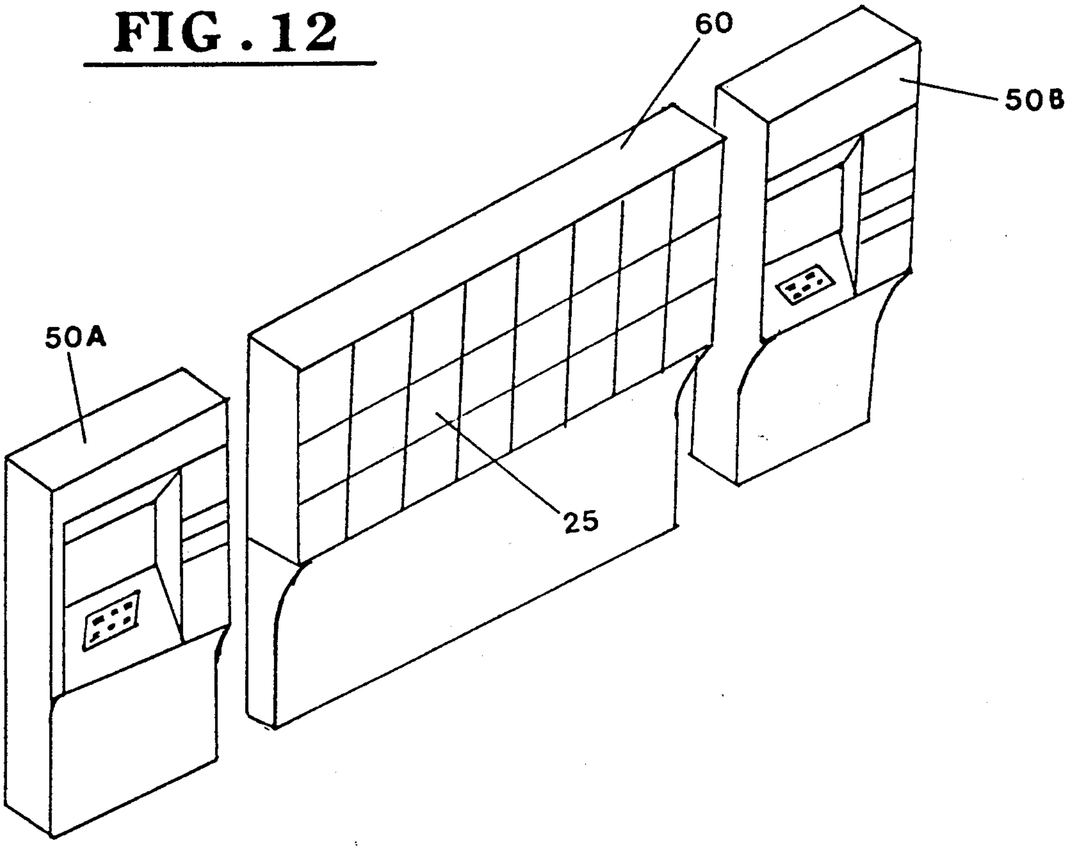
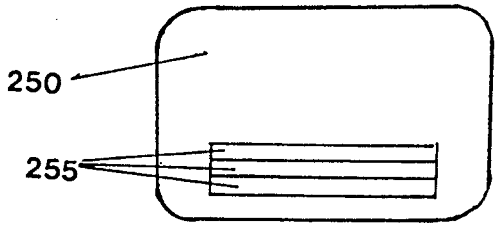
FIG. 13A
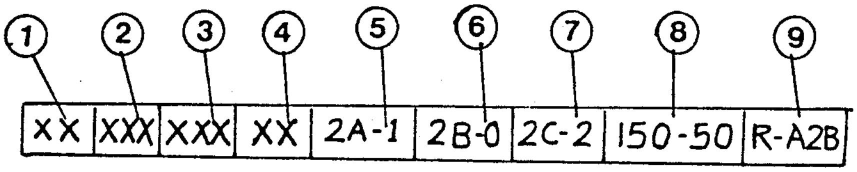
FIG. 13B

AUTOMATED RENTAL SYSTEM

The present invention is a continuation-in-part of copending patent application, Ser. No. 020,328filed 2/27/87, now abandoned.

BACKGROUND OF THE INVENTION

1. Field of the Invention

The present invention relates to automated vending systems, and more particularly to a computer controlled rental system for articles such as video cassettes and players.

2. Description of the Prior Art

Although a wide variety of vending machines is well known in the prior art, advances in technology and computers have made sophisticated vending systems possible for rentals of articles such as video cassettes and attempts to provide automated systems are known. For example, U.S. Pat. No. 4,598,810 to Shore et al discloses a system which utilizes a robotic arm distribution technique and is limited in the number of cassettes, or other articles that differ by shape, size or weight such as VCR, cables, etc. The time required for a transaction is substantial, especially when number of articles are high and no means is provided to identify the returned item. Gould et al in U.S. Pat. No. 4,300,040 teaches an ordering terminal which includes a display previewing video materials. U.S. Pat. No. 4,458,802 to Maciver et al describes a method of renting articles with distribution means using a carousel system which is limited in the number of articles it can handle, variety of articles, and differences in size, shape and weight.

Other known patented dispensing devices are described in the following patents: Couch, U.S. Pat. No. 4,650,977; Simjian, U.S. Pat. No. 3,824,544; Bengtsson, U.S. Pat. No. 3,964,577; Naito et al, U.S. Pat. No. 3,648,241; Anne, France #2,548,806; and Spooner et al, G.B. #2,143,662.

SUMMARY OF THE INVENTION

The present invention provides an unattended vending machine for renting out items such as video cassettes and video cassette players. Although the following description will discuss vending of rental video cassettes and players, it is to be understood that the invention is not so limited, but may be used for sale or rental of many other items. Each item has an electronic identification strip with a unique electronic code and disposed in a special storage cartridge. The cartridge is stored in a designated bin in a bin storage unit. Each bin has a means of latching, identifying, and releasing the cartridge. In response to a patron's selection, a computer sends out instruction data to several control modules utilizing microprocessors. Each control module is responsible to process the instructions from the computer and to take appropriate actions to control a set of bins associated with that control module. A check acceptor box is provided to accept and process the checks and a magnetic card reader handles credit transactions.

A selection terminal provides required information to a patron. The patron operates a keyboard to energize a monitor which lists all features available in the inventory, provides rates, code numbers, and availability status. When a choice has been made, the patron enters it into the operating terminal.

In a rental process, a patron with a member or credit card enters its card into the card reader slot and enters an access number on a keypad if applicable. Once the patron is identified by the computer and credit is available, the patron is instructed to enter the desired selections. The terminal, in turn, activates the controls to unlock the appropriate selections in the respective bins and the monitor instructs the patron to retrieve the selections from the designated bins.

During a return process, the patron inserts the returned selections into the appropriate bins. When an item is properly identified, the internal controls lock the bin and stores the acceptance message. Thereafter, the patron interacts with the operation terminal, which in turn identifies the patron, receives acknowledgments from the internal control module of the item acceptance and displays fees due from the patron. A patron card member has the choice of using his available credit line or depositing a check for the required amount in a check acceptor box.

As will be understood, the present invention works in a communication mode and does not require a central distribution mode, a robotic arm or a carousel system. Thus, by communication of commands and information, controls are activated by the transaction process for facilitating retrieval of an article from its bin and identifying and securing the returned article. The present technique also facilitates the rental of articles of any size and volume.

BRIEF DESCRIPTION OF THE DRAWINGS

FIG. 4 shows a perspective view of a storage cartridge for storing video cassettes or the like;

FIG. 10 represents an alternative arrangement of a bin for storing multiple articles therein;

FIG. 11 illustrates the internal arrangement of the bin of FIG. 10;

FIG. 12 illustrates a system arranged for a drive-in application;

FIG. 13A represents a patron member card having coded magnetic stripes;

FIG. 13B is an outline of typical fields in a magnetic stripe of FIG. 13A;

DETAILED DESCRIPTION OF THE PREFERRED EMBODIMENT

Figure 1:
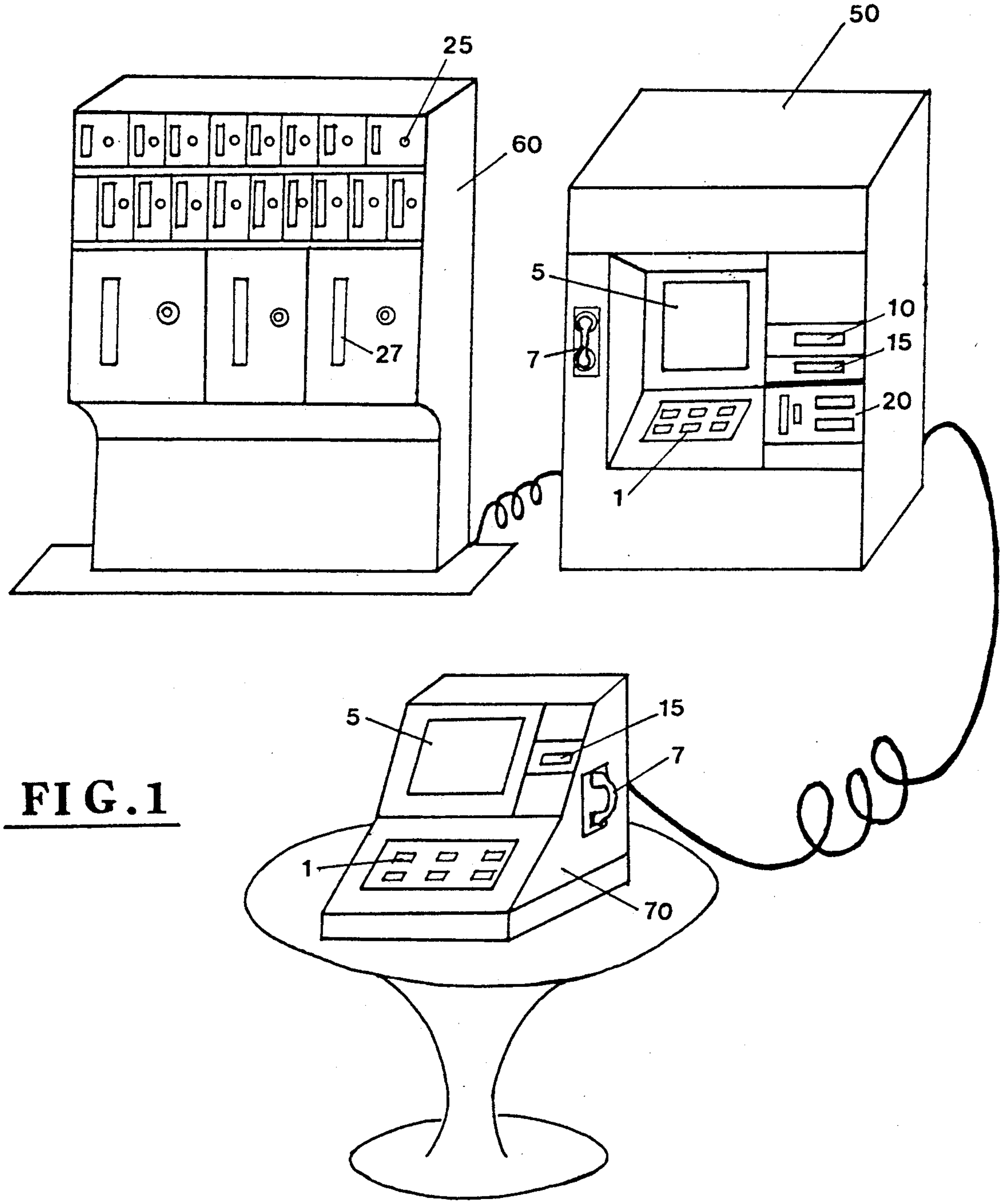
FIG. 1 shows a diagrammatic view of a bin box storage unit, an operating terminal, and a selection terminal in a typical installation.

FIG. 1 shows the general arrangement of a station with a bin box storage unit 60, an operating terminal 50, and a selection terminal 70. Each bin 25 in storage 60 is assigned an article code 27. A main computer, to be described hereinafter, controls a particular bin box responsive to the entering of a particular article code into the keyboard by a customer. In a preferred arrangement, the description of an article stored in a bin 25 can be viewed by a patron from outside of bin 25. Bin box storage unit 60 is connected by electrical cables to operating terminal 50. Operating terminal 50 includes a keyboard 1, monitor 5, sales receipt slot 10, card reader/writer slot 15, a money transaction box or check acceptor box 20, and a dialless phone 7, which may be connected to a central office or to a manager for use in an emergency or occurrence of problems. A selection terminal 70 includes a keyboard 1, monitor 5, a card reader/writer slot 15 and a dialless telephone 7.

Figure 2:
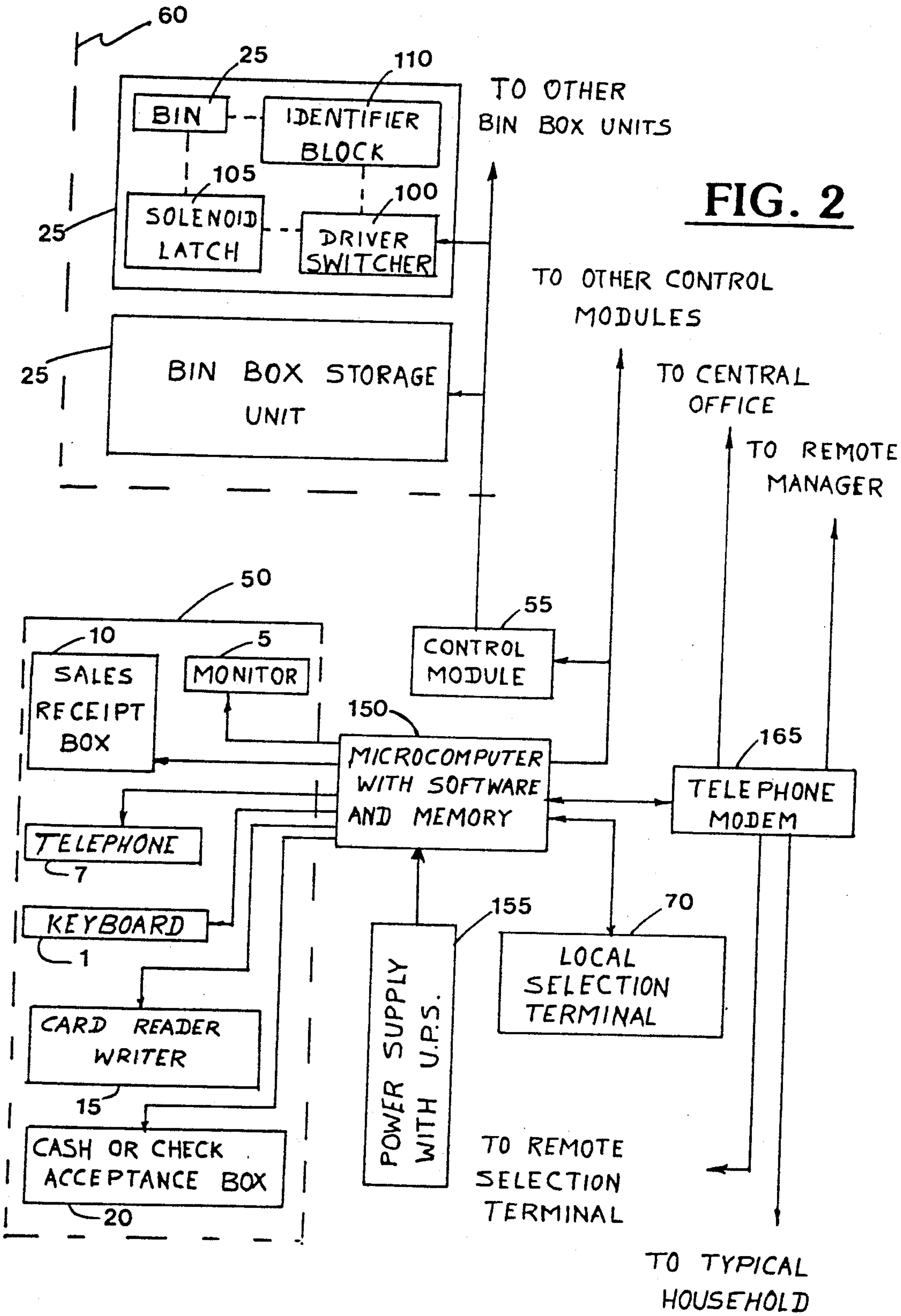
FIG. 2 provides a block diagram with individual component and devices of a typical station with bin box storage units, an operating terminal and a selection terminal.

FIG. 2 is a block diagram of the individual elements of a typical station. A bin box is shown to include basically a bin 25 for article storage, an identifier block 110 to identify the returned item, a solenoid or a similar apparatus 105, to latch or release the article from the bin 25, a nd a driver/switcher 100. Activities in a bin 25 are controlled by a control module 55. Each control module 55 controls a selected number of bins 25. Thus, a plurality of modules 55 may be required. A microprocessor within control module 55 communicates with the main computer 150, and produces commands to trigger solenoid 105 and to process the identification. Power supply 155 supplies AC and DC power as needed. In case of power failure, the main computer software activates power failure switches 160, enabling a UPS in power supply 155 for control of doors, lights, emergency deposit boxes, etc. A telephone modem 165 is shown to receive information from a central office, remote manager, remote selection terminal and a typical household.

Figure 3:
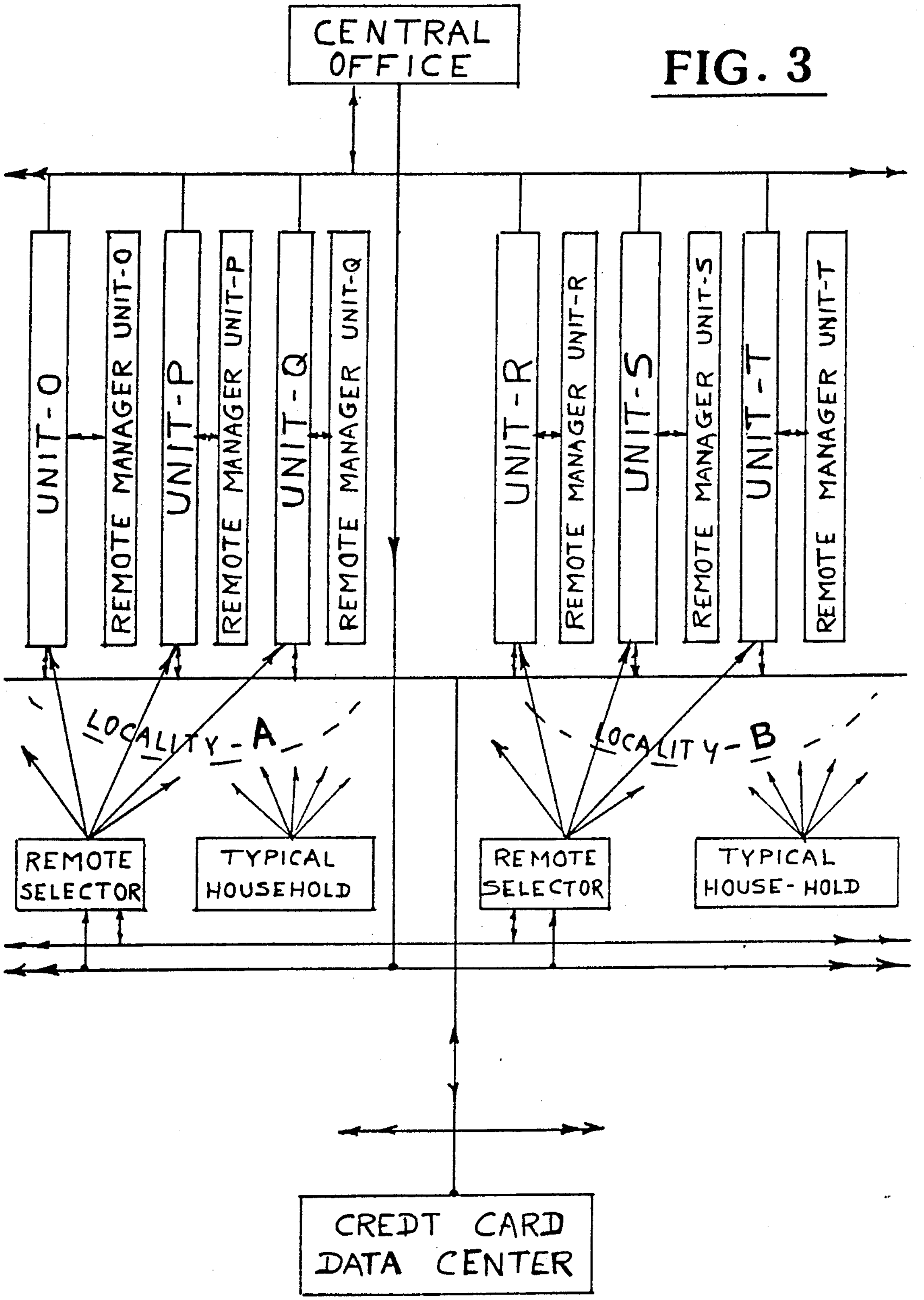
FIG. 3 shows a block diagram of an entire system and related communication links.

FIG. 3 presents a simplified diagram of a system with communication links between various stations of the system. A central data center has been shown which interacts with each station as well as updating the remote selection terminal. The software may include master member files, statistics of transaction records that it receives from each station periodically, updating inventory listing of each station on a corresponding selection terminal, updating bad card data with a bad card file in each station and each selection terminal, and making financial and other reports. In a given locality, there may be one or more remote selectors with a telephone communication line tied to selected stations in that locality. The software for each selector is able to direct communications with desired stations in a programmed fashion and to obtain article availability status as well as to reserve an available article at a designated station, if so desired. A station can also check with the credit card data center for the validity of a card. It is also within the scope of this invention that a communication system and its software can be provided, whereby a household, knowing the code of a desired cassette, for example, is able to enter it by manipulating the telephone dial in a programmed manner, and receive an availability status of that cassette from that station at the home telephone. The customer may then reserve the selection, if so desired.

Figure 4:
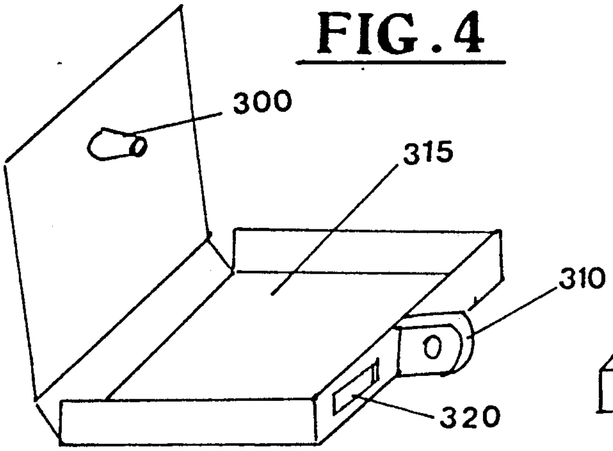
Figure 5:
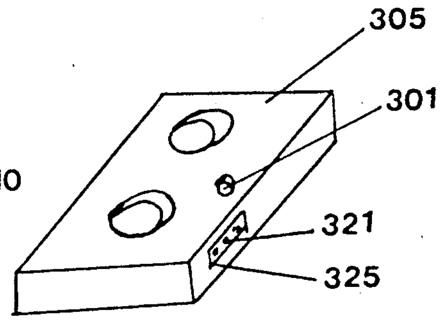
FIG. 5 is a perspective view of a video cassette with identification strip and a guide opening.

FIG. 4 represents a storage cartridge 315 for holding a video cassette 305 shown in FIG. 5. Video cassette 305 has an opening 301, and an identifier strip 325. When storage cartridge 315 is closed, a guide 300 is inserted into opening 301 which positions cassette 305 in such a way that identifier strip 325 is exposed through window 320 to allow contact points 321 on identifier strip 325 to mate with contact points on an identifier block 110, inside bin 25. When cartridge 315 is placed inside a bin 25, the plunger of solenoid 105 engages knob 310, and thereby locks the cartridge 315 with its cassette 305 in bin 25.

In an alternative arrangement, a storage cartridge 315 can be omitted by placing a cassette 305 in an opening inside bin 25 and locking the cassette 305 using an opening therein, such as opening 301, or the bin door may be externally secured. Also, means to eject the released item from bin 25 to facilitate access may be provided as will be obvious to those of skill in the art.

Figure 6:
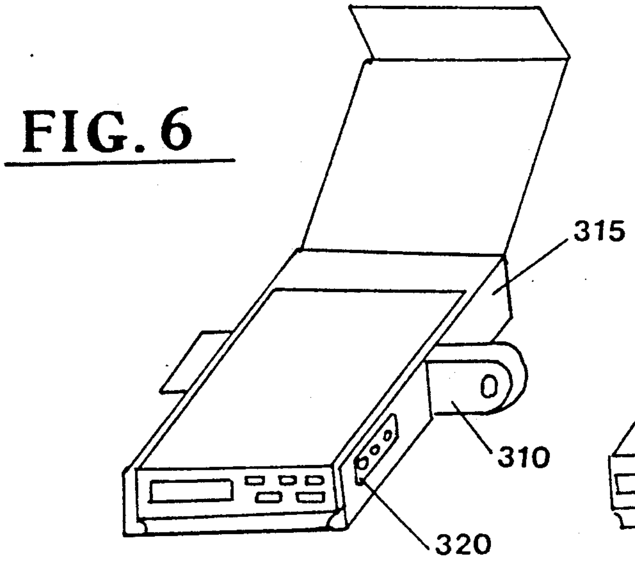
FIG. 6 shows a perspective view of a videoplayer storage cartridge with a video player disposed therein.
Figure 7:
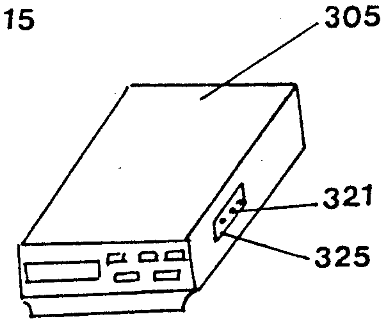
FIG. 7 is a perspective view of a video player showing an identification strip.

FIG. 7 shows a video cassette player 305 with an identifier strip 325 and contact points 321. FIG. 6 shows a suitcase-style storage cartridge 316, with video player 305, stored therein with identifier strip 325 exposed through window opening 320. These and similar items may be stored in appropriate size bins.

Figure 8:
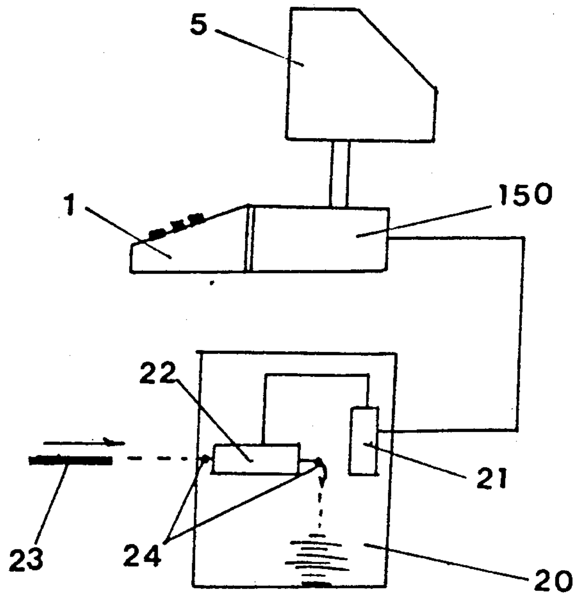
FIG. 8 shows a representative arrangement of a check acceptance box controlled by a computer system.

FIG. 8 shows a simplified diagram of a check acceptor box 20 responsive to main computer 150 with its keyboard 1 and monitor 5. In an appropriate phase of a transaction with an operating terminal 50, a patron is required to deposit a check 23 in acceptor box 20. When check 23 is fed into box 20, internal sensors 24 activate a printer 22, through intelligent interface 21, to process the check by transporting and printing data thereon in a desired manner. Computer 150 transfers the printing data such as date, time, account number, dollar amount, etc. to an intelligent interface 21. When the process is completed, interface 21 sends an acknowledgment to computer 150. The type of sensors, number of sensors and their position is a matter of choice to serve the above mentioned purpose. The intelligent interface 21 is designed and programmed to communicate with computer 150, provide instructions to printer 22 for activities such as feeding check in; stopping feeding and starting printing supplied data; and starting feed; dumping the check inside the box 20; maintaining the timings of such activities by accepting signals from sensors 24; and finally acknowledging back to computer 150.

Figure 9:
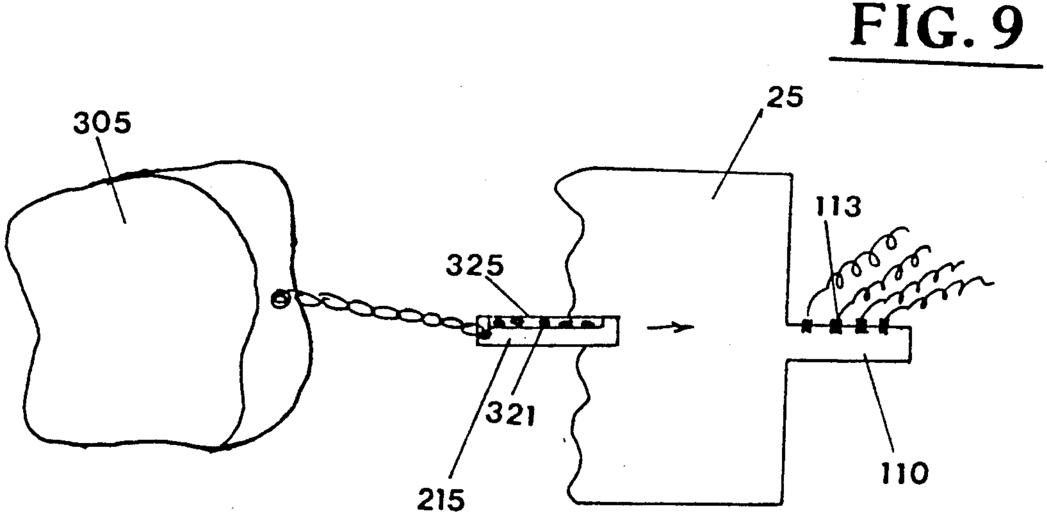
FIG. 9 illustrates an alternative arrangement to identify an article without a storage cartridge.

FIG. 9 demonstrates an example of an arrangement wherein an identifier strip 325 mounted on a plastic key 215 is inserted into an identification socket 110 in a bin 25. Strip 325 makes a contact with the contact points 113 in identification socket 110. This configuration is utilized where article 305 is of a shape or size inappropriate for a storage cartridge.

In an alternative embodiment, as shown in FIG. 10 and FIG. 11, a bin can hold and control the rental process for a plurality of identical articles, such as video cassettes. FIG. 10 shows the outside of such an individual bin box . It has a driver/switcher 100, identification block 110 and a box 330 that feeds electrical signals for latch control.

FIG. 11 shows an internal view of FIG. 10 and illustrates the working principle of the bin.

In this illustration, cassettes 305A, 305B and 305C are loaded with spring assembly 127 to sequentially push the cassettes, which are held in position by retaining tongue 130, out of the bin. A tongue control box 125 pulls in tongue 130 and repositions the tongues in response to control signals from a control module, so that during retrieval or during acceptance, it would hold back. A solenoid 105 or a similar component is activated by the control module. When a loaded article is correctly identified, a solenoid 105 controls the plunger and the associated link mechanism 122, to move the identified article inside and stack it with the remaining articles, behind the position of tongue 130.

An alternative embodiment of the present invention is a drive-in arrangement to rent a desired article, as shown in FIG. 12. There are two operating terminals 50A and 50B, with a bin box storage 60. The terminal 50A is meant to facilitate the access to articles and to finish the dispensing transaction. To return the articles, the patron would first deposit them in an appropriate bin 25 and then approach the operating terminal 50B where the return operation is completed. The selection terminal may be adjacent the operating terminals or at a remote location.

FIG. 13 represents a typical patron card 250 with three standard magnetic stripes 255. To illustrate an identification and transaction record, an enlargement of a stripe with its numerical fields is shown. Fields 1, 2, and 3 may contain a member identification number with station data to indicate origination of membership. Field 4 may be a restriction on certain movie ratings. Fields 5, 6 and 7 may limit the number of articles A, B and C that a patron can rent out at one time. For example, Field 5 represents that a patron is allowed to rent out two articles in Category A and that so far, he has rented out one article in that category. These allowable numbers could vary from patron to patron. Alternatively, there may be no limit on any category and the patron can rent any number of items from any category as long as the overall cost would not exceed the available credit for that patron.

Figure 14A:
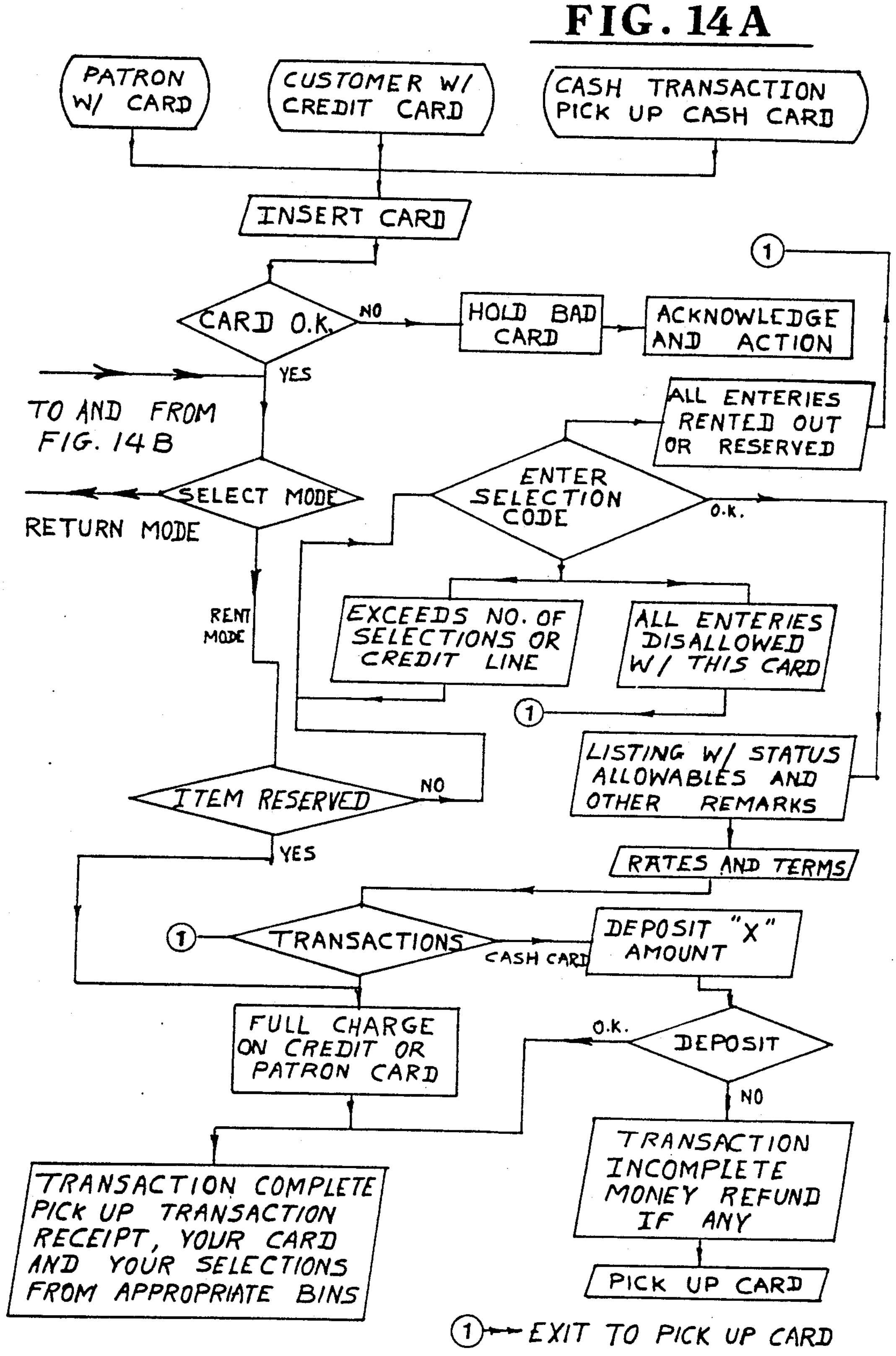
FIG. 14A and 14B is a flow-chart representing a transaction and process by a patron using an operating terminal.
Figure 14B:
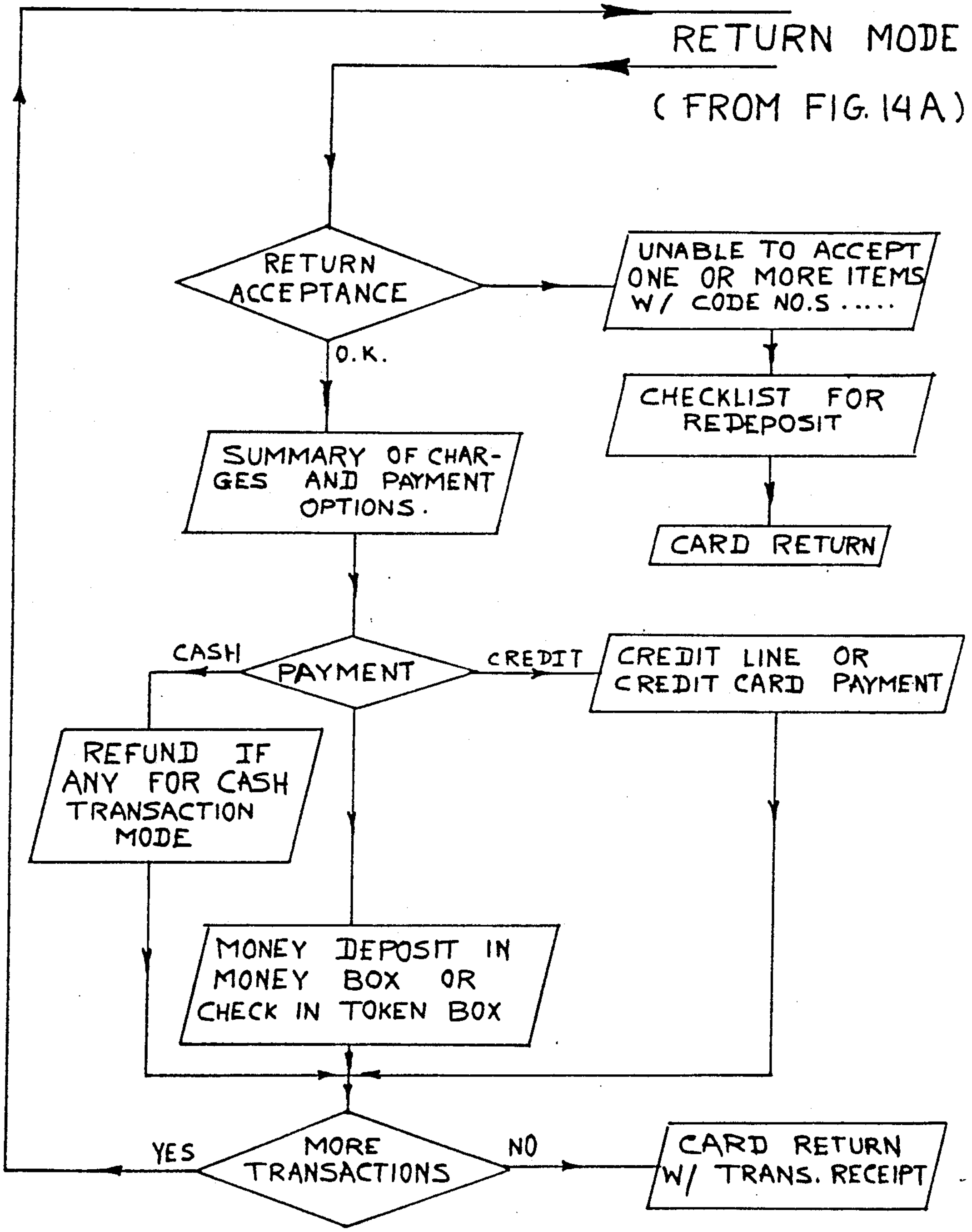

FIGS. 14A and 14B are flow charts illustrating the transaction process at an operating terminal initiated by a patron or customer. The patron inserts his membership card and enters a secret code into the keyboard. A credit card holder inserts his credit card. A customer without a card, desiring a cash transaction, picks up a cash card from a supply at the terminal and inserts that card to initiate the transaction. The customer retains the cash card until he returns the article. If the customer in a cash transaction wishes to return the article, he inserts the same cash card that he picked up and when finished, receives an appropriate refund from the customer's previous deposit. For a credit card transaction, computer 150 checks the validity of the card. For a member card 250, computer 150 first checks out whether the card is a lost or stolen card. Once the card is accepted, the patron selects mode, i.e., to rent or to return the article. In a rent mode, if the item is not reserved, the patron enters the code number of his selections. Any one of several alternative actions follows. If all entries have been rented or reserved, a message would appear with a request to pick up a card from a card reader/writer and to enter different selections. This exit procedure is identified as Exit 1 in FIGS. 14A, B.

Another alternative may be that all entered selections are not authorized under that card privilege, such as an adult movie. In such case, a message would follow leading to Exit 1. If the number of selections are more than the patron is allowed or if patrons' selections would cause the credit limit to be exceeded, the card holder would be requested to screen out the selections within the limit. If all selections are acceptable or partially so, the listing with appropriate remarks as to what items cannot be approved appears and the items that are allowed will appear on the monitor screen, along with the rates and terms of rental.

In another step, a customer with a cash card would be asked to deposit a determined amount and to complete the transaction. If the deposit is not sufficient, a message to Exit 1 and card pick-up will appear. Further instructions are provided with the credit card transactions. Transactions are completed by writing of transaction records on an appropriate card which is brought out to be picked up by the card holder. When items are previously reserved on a card, the computer will unlatch the appropriate bin boxes and complete the transaction by writing the transaction record on the card.

In the return mode, when one or more returned items are not identified correctly, the monitor will provide instructions to deposit the item correctly, along with an instruction to pick up a card. When items are identified and accepted, the monitor will display a summary of the charges. A cash card holder obtains a refund if the initial deposit is more than the rental charge. Credit card holders will be credited for refund on their credit card. Member card holders may have an option to either deposit the charges in a money box or check acceptor box, or to put charges against their credit line limit. If the card holder is interested in making further transactions, then he will enter into the rent mode and start again. Otherwise, the customer will retrieve the receipt and his card.

Figure 15A:
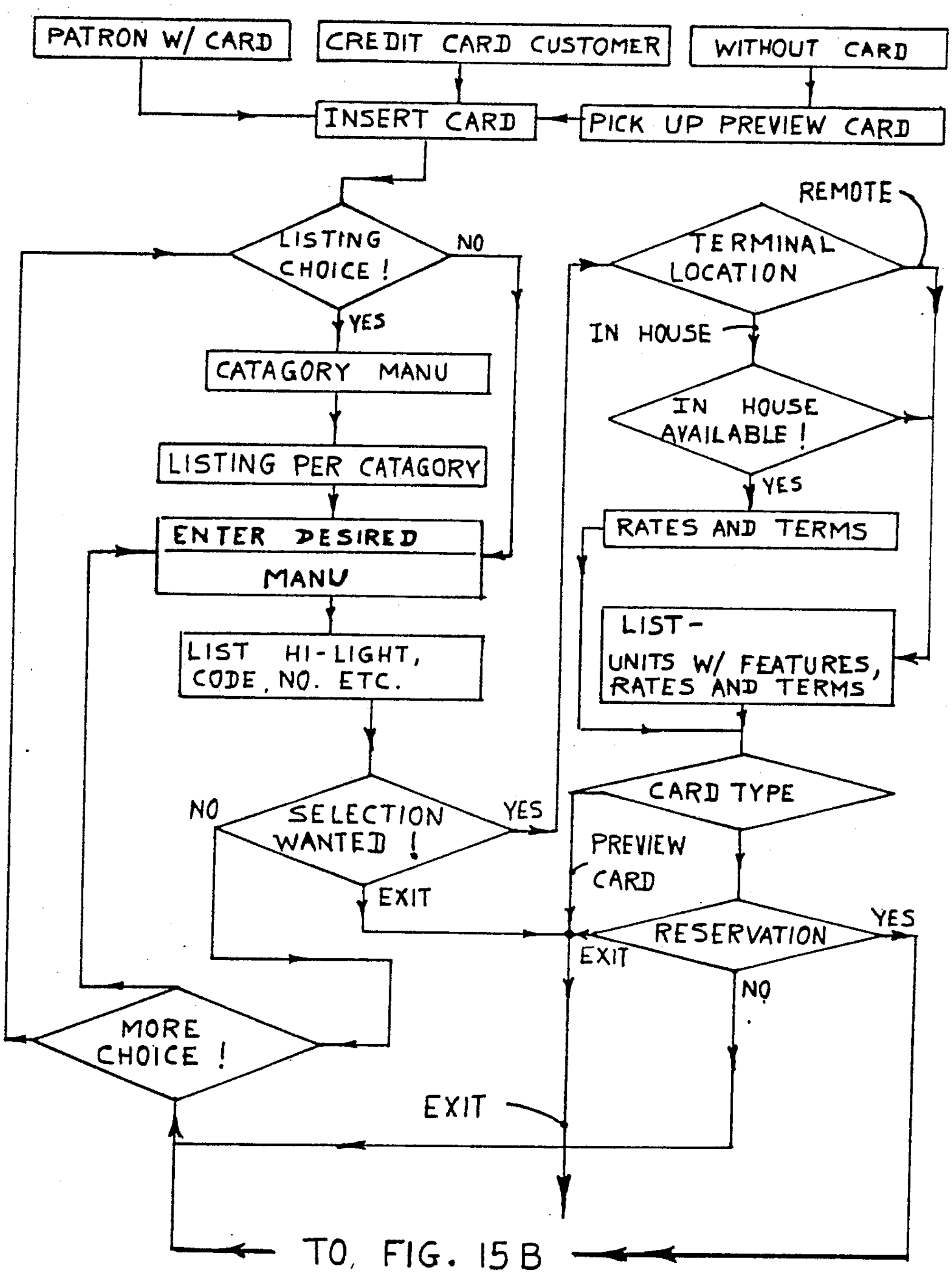
FIG. 15A and 15B is a flow chart representing the process of article selection and reservation at a selection terminal.
Figure 15B:
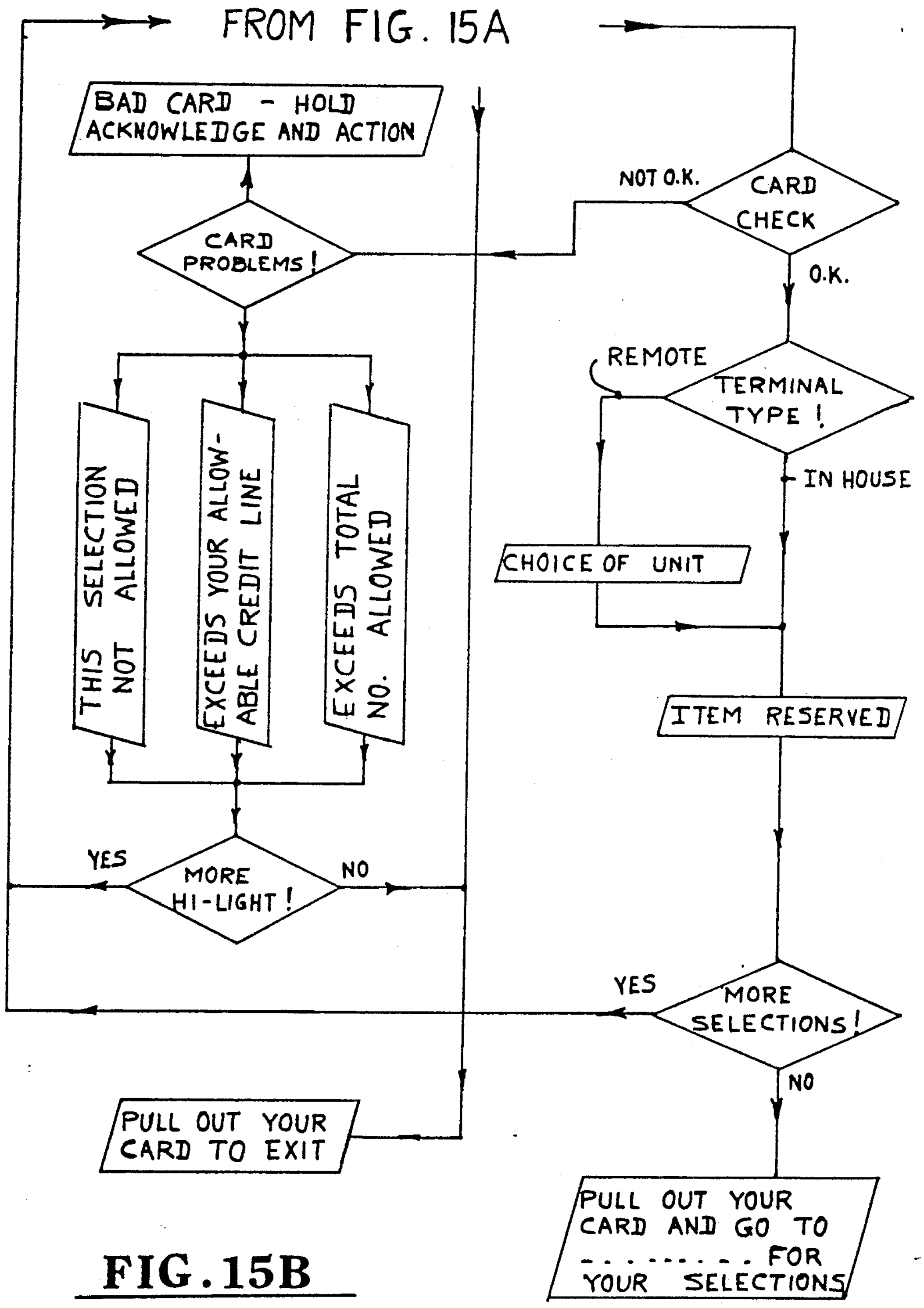

FIGS. 15A and 15B are a demonstrative flowchart to illustrate the selection and reservation process at a selection terminal. The process can be initiated by anyone, but only a patron and credit card customer can reserve their selections. The reservation process is applicable only for rental items. Cash transaction customers can receive all of the selection information with a preview card without the reservation feature. This provision can be added with a money box and by revising the software. Once an appropriate card is inserted, a choice is selected by entering displayed instructions via the keyboard. The monitor will then display stations carrying that selection, code number, etc. of a selected item. If the information satisfies the customer, an availability status is checked. For an in-house selection terminal, the computer will check the inhouse availability and display rates, terms and code number of a desired items. For a remote terminal, a listing of stations that carry a particular item would be displayed with the rates and terms for each station.

In the next step, a preview card holder, as well as others who decide not to reserve, would lead to Exit. The first step in a reservation process is to check the card and its data. An appropriate action would be taken for a bad card, or prohibit making a reservation as per limitations set on that card. If a card is checked out as acceptable for the reservation, the item would be reserved with a choice of station from the remote terminal. The process will continue for additional selections and/or reservations if so desired. Otherwise, the transaction will be completed with instructions to collect the selected items at the desired station and to retrieve the card.

Figure 16:
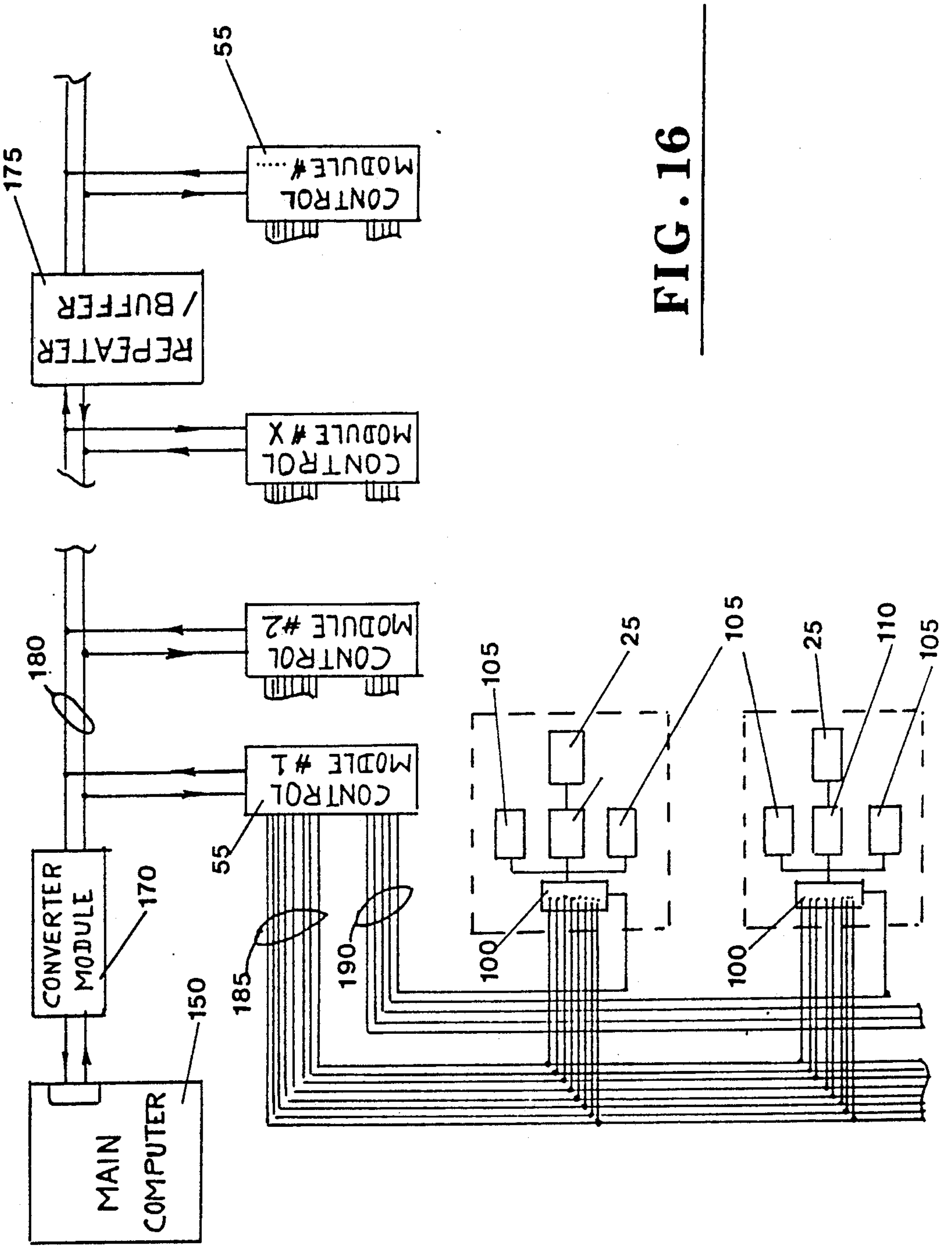
FIG. 16 is a block diagram of components and communication channels for various activities in the article storage bins.

FIG. 16 is a schematic diagram showing how the main computer 150 processes the activities in a typical bin 25. The instructions with a bin address from computer 150 at the RS-232 port is monitored and converted to RS-485 level via converter module 170. All control modules 55, receive the instructions with appropriate address, but only one control module 55 with that address responds by further activating its control lines 185, and corresponding status line 190. A bin 25 with that address, defined by a particular status line 190, performs the commanded function. Bins 25, tied to other status lines, would remain inactive.

For a large system, a repeater/buffer 175 may be used to amplify the communication signals. In a small system with few control modules 55, a converter module 170 and repeater/buffer 175 are not required. In an alternative arrangement, when a control module 55 is tied to only one bin 25, there is no need for a status line 190, and driver/switcher 100. The control module 55 has a built-in automatic control for identification and thereafter locking of a returned article 315 in its bin. With such control, the return of an article 315 in a bin 25 is sensed and in response, the control module 55 will identify the article and, if identification is acceptable, will secure the article 315 in bin 25 and save the message for follow-up computer inquiry.

Figure 17:
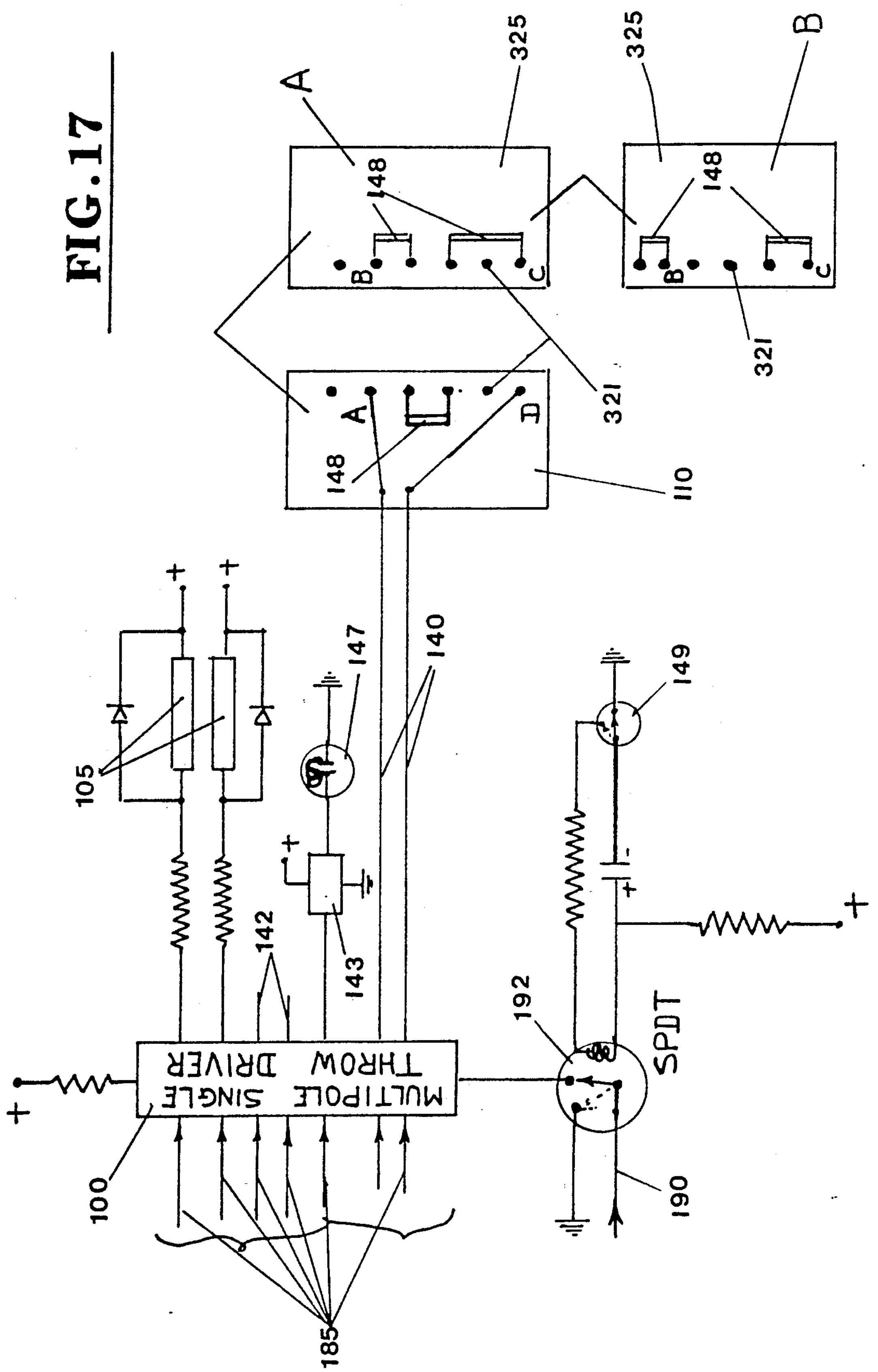
FIG. 17 is a schematic diagram of the control system for a typical storage bin.

FIG. 17 shows an electrical block diagram for a bin 25. A driver/switcher 100, solenoid 105, for the locking and releasing means are provided. Lines 142 provide an acknowledgment of the latching and releasing actions in bin 25. Acceptor light 147 is illuminated in connection with latch relay 143 and a signal from control line to show the patron that the returned article 315 has been accepted.

When article 315 is returned to a bin 25, a SPDT sensor switch 148 triggers the relay 192 to pass an interrupt to control module 55 on status line 190. To perform any action on bin 25, the control module holds line 190 during appropriate actions on control lines 185. Lines 140 connect to an identifier circuit. Two separate identifier strips 321A and 321B are shown as an example. When identifier block 110 and one of the identifier strips 321 mate, only identifier strip 321A maintains continuity between leads A and D on identifier block 110 and also provides a predetermined electrical value therebetween. The predetermined electrical value is recognized by control module 55, via lines 140 as a successful identification. Item 148 may be any electrical component. Mating identifiers 110 and 321 each have a selected number of contact points 325. When an article 315 is returned in a bin 25, the corresponding contact points on both identifiers are in full contact. The electrical circuit between the predesignated contact points make one identifier different from another. To obtain a desired number of addresses, there may be a selected number of contact points 321 having a selected number of values of electrical component 148.

Figure 18:
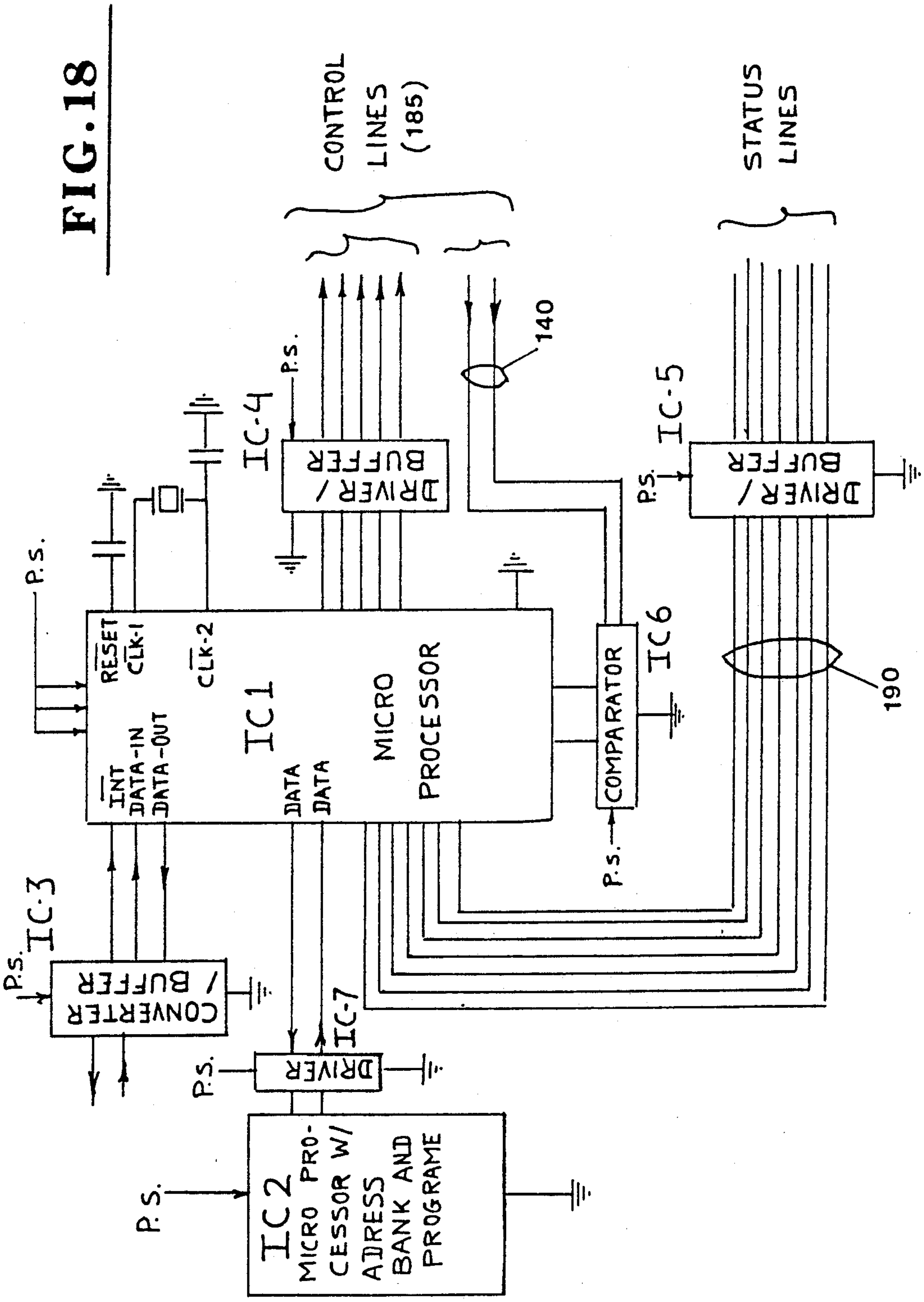
FIG. 18 is a block diagram of a control module.

FIG. 18 demonstrates an electrical block diagram of the control module 55. When an instruction with address arrives in RS-485 at converter/buffer IC-3, the data is translated into TTL and delivered to microprocessor IC-1. IC-1 in turn, calls to IC-2, a preprogrammed EPROM microprocessor with a set of addresses. If the called address falls within the range of IC-2, then IC-2 loads IC-1 with appropriate programming instructions. IC-1, in turn, activates the appropriate control line 185 with set timings and an appropriate status line 190. SL-1 and SL-2 are solenoid activation lines. Microprocessor IC-1 checks the identifier circuit lines 140 through comparator IC-6 for continuity and for the electrical value of component 148. P.S. is the power supply. Control lines 185 and status lines 190 are fed to bins 25 through driver/buffer IC-4 and IC-5 respectively. IC7 is a driver/buffer between microprocessor IC-1 and microprocessor IC-2. In an alternative arrangement, when control module 55 is controlling only one bin 25, all status lines 190, and IC-2 are not required. In that arrangement, IC-1 is masked with programming instructions and a control module address is confined by a set of external dip switches. The number of status lines 190 determine the capacity of control module 55 to control bins 25. The number of status lines 190 is a matter of choice.

Figure 19:
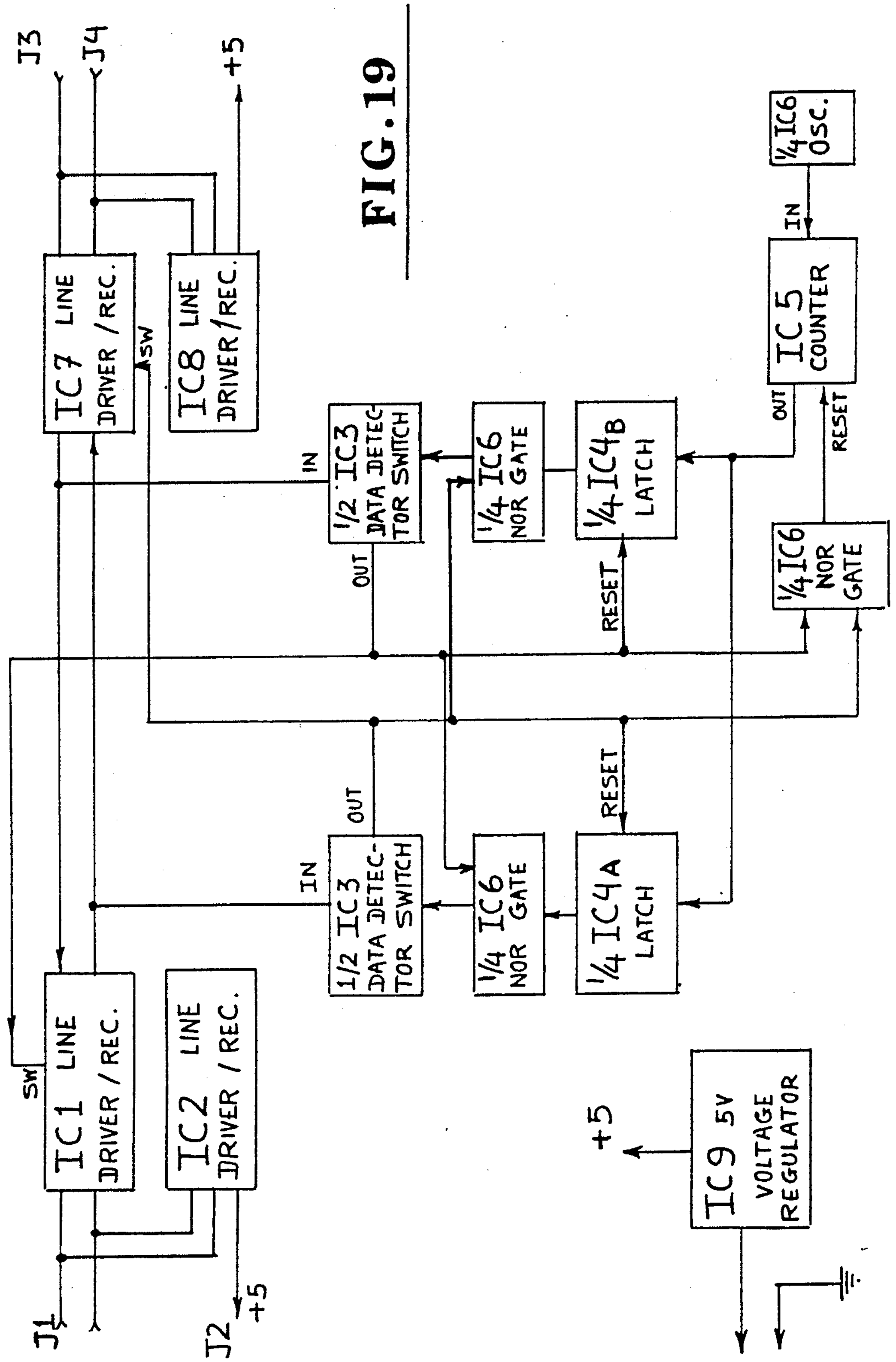
FIG. 19 is a block diagram for a repeater module.

FIG. 19 is a representative block diagram for a repeater/buffer module. IC-9 is a voltage regulator to supply +5 VDC. IC1, IC2, and IC7, IC8 are line driver/-receivers on each side. IC3 on each side checks the data input from corresponding side and activates the driver on the other side. IC4 is a latch to complete the communications from one side with the help of oscillator IC6, counter IC5 and nor gate IC6. In one instance, IC1, IC2 or IC7, IC8 work as a driver and in another instance, store the received data in the buffer. Counter IC5 makes either IC3 into a receiver or a drive mode for a designated time of communication. For a small system with one bin box storage, a repeater module is not required.

Figure 20:
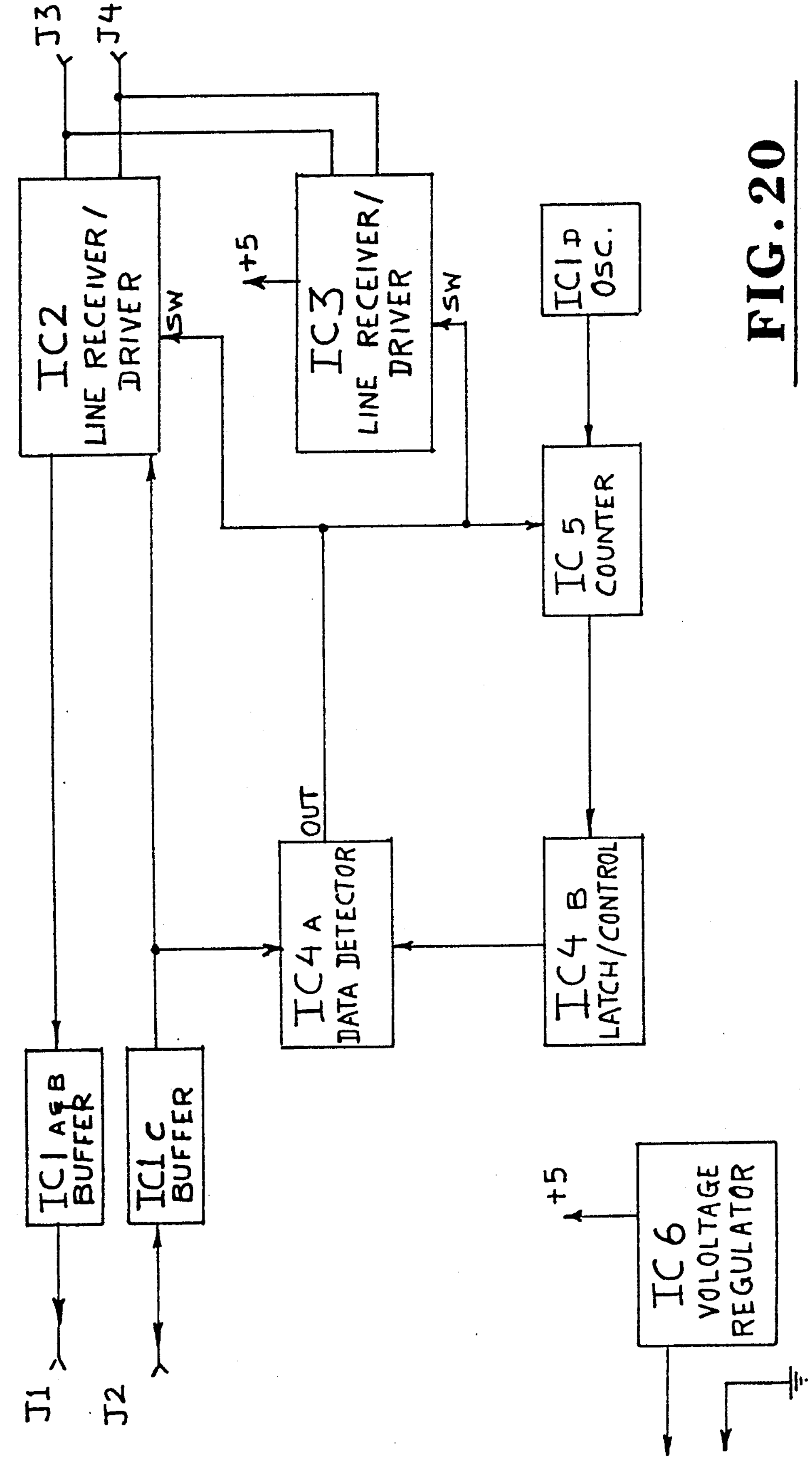
FIG. 20 is a block diagram for a converter module.

FIG. 20 is a representative circuit diagram for a converter module. IC1A and IC1B are shift/buffers, IC2 and IC3 are driver/receivers, IC4A is a data detector, IC5 is a counter, IC4B is a latch and IC1D is an oscillator. IC4, a data detector, detects data from either side. When it detects the data, it turns on the counter and activates the driver or a receiver when time expires, IC4B latch stops the data flow and causes IC4A to start the cycle. Primarily, this module converts RS-232 to RS-485 levels and controls the incoming and outgoing flow. Conversion of RS-232 to RS-485 level can be avoided for a small system, thereby allowing direct communication between main computer and control modules.

Although specific designs and arrangements of the system of the invention have been disclosed, it is to be understood that these are for exemplary purposes only. Many variations thereto will be obvious to those of skill in the art and such changes are considered to fall within the spirit and scope of the invention.

I claim:

1. An unattended article rental system comprising:

(a) a plurality of article storage bins for storing articles to be rented, and for receiving articles being returned;

(b) an identification system including a first identification code device disposed in each of said bins and second identification code device associated with each article in a bin wherein the identification of a bin matches the identification of an article assigned to such bin;

(c) a plurality of remote controlled locks, one of said locks associated with each of said bins;

(d) a control module connected to said identification system and said remote controlled locks;

(e) a customer terminal having at least one keyboard and at least one display monitor; and (f) a computer connected to receive inputs from said keyboard and connected to said control module, said computer programmed to direct said control module to unlock a remote controlled bin lock in accordance with a selection entered into said keyboard, and to lock a bin receiving an article having a code device matching said bin code device.

2. The system as recited in claim 1 in which said remote control bin locks are electrically controlled.

3. The system as recited in claim 2 in which said first and second matched code devices include a first code strip having a plurality of first contacts with electrical continuity between preselected pairs thereof, and a second code strip having a plurality of second contacts mating with said first contacts.

4. The system as recited in claim 3 in which selected pairs of said first code contacts have predetermined electrical values therebetween.

5. The system as recited in claim 2 in which:

each of said articles includes one of said first code strips attached thereto, and said article is disposed in a cartridge, said cartridge having an opening adjacent said first code strip; and each of said storage bins includes one of said second code strips having a plurality of electrical contacts for contacting selected ones of said first code strip contacts through said opening, said storage bin code strip contacts connected to said control module.

6. The system as recited in claim 1 in which said computer includes memory for storing status and identification data for available articles, said computer operating said customer terminal display monitor to display said data.

7. The system as recited in claim 1 in which said customer terminal further includes means for receiving customer identification information.

8. The system as recited in claim 7 in which said identification receiving means is a magnetic card reader.

9. The system as recited in claim 6 which further comprises at least one remotely located customer terminal electrically connected to said computer.

10. The system as recited in claim 9 in which said customer terminal includes:

a) an operating terminal having
 i) a first keyboard,
 ii) a first display monitor,
 iii) a first magnetic card reader/writer,
 iv) a check acceptance box, and
 v) a sales receipt box;

said operating terminal communicating with said computer for identification of a customer magnetic card, for requesting article availability data, for displaying article availability and rental data, and for accepting check, cash and credit payments from a customer; and b) an article selection terminal having
 i) a second keyboard,
 ii) a second display monitor, and
 iii) a second card reader/writer;

said selection terminal communicating with said computer for reserving rental articles, for selecting articles to be rented, and for displaying article availability and rental data.

11. The system as recited in claim 2 which further includes:

a plurality of said control modules;

each of said control modules having a multiple conductor connected to each of said plurality of second code contacts of said storage bins; and each of said control modules having a status control conductor to each of said storage bins for operating said remote controlled locks and for controlling said identification system.

12. The system as recited in claim 5 in which said cartridge includes:

a locking knob for engaging said re mote controlled lock; and a guide for engaging and aligning an article in said cartridge.

13. The system as recited in claim 10 in which said operating terminal includes:

a) a check acceptance box connected to said computer and having
 i) check transport means,
 ii) sensors for sensing presence of a check, and
 iii) a printer responsive to instructions from said computer for printing data on a check.

14. The system as recited in claim 1 in which said system further comprises;

a central data center having a main frame computer having master authorized customer files, transaction records, inventories, and financial data stored in memory;

a plurality of said geographically separated subsystems in accordance with claim 1; and a plurality of communication links from each of said subsystems to said central data center for transmitting and receiving transactional data therebetween whereby said main frame computer processes incoming data and transmits updating data to said subsystems.

15. An unattended article rental system for vending articles to authorized customers and for receiving returned articles comprising;

a) article storing means having a plurality of bins for storing respective articles for rental and for receiving respective articles returned by customers, each one of said bins having
 i) remotely operated locking means for securing and releasing articles in said bin, and
 ii) a first identification code strip for each of said bins, each of said articles in a bin having a second identification code strip having the same identification code as its bin;

b) an operating terminal means having
 i) card reading means for reading a customer identification card,
 ii) first keyboard means for entering of requests for information about said articles by an identified customer, and
 iii) first monitor means for displaying information about said articles;

c) selection terminal means having
 i) second monitor means for displaying information about available articles,
 ii) second keyboard means for entering information including the identification code of bin and article selected for reserving or rental of same by an identified customer, and
 iii) card reading and writing means for obtaining customer information from a customer card and for recording customer entered information on said card; and d) computer control and record keeping means connected to said operating terminal means, said selection terminal means and said article storing means for verifying authorization of said customer identification card, for producing a record of the identity of such authorized customer, for storing entered information, for sending said information to said first and second monitor means, and having control module means for operating said bin locking means.

16. The system as recited in claim 15 in which:

each of said bins includes an article holding cartridge and a solenoid operated latch for engaging said cartridge;

said identification code strip of each article includes a plurality of first electrical contacts, wherein at least one pair of said contacts includes an electrically conducting element thereacross; and each of said bins includes second contacts for engaging said first contacts when said article and cartridge are in said bin.

17. The system as recited in claim 16 in which:

said control module includes:

i) means for checking that a returned article deposited in a bin has the correct identification code for that bin, ii) means for energizing a signal at such bin to indicate an incorrect code, and iii) means for locking such bin when a correct code is determined and energizing an articleacceptance signal.

18. The system as recited in claim 15 which further comprises an uninterruptable power supply.

19. The system as recited in claim 15 which further comprises:

a first telephone modem connected to said computer control means;

at least one of said selection terminal means disposed at a location remote from a location of said article storing means; and communication means for connecting said remotely located selection terminal means to said telephone modem.

20. The system as recited in claim 19 in which said remotely located selection terminal means includes a second telephone modem.

21. The system as recited in claim 15 in which said computer control and record keeping means includes memory means for storing data concerning articles stored in said bins, customer identification data, customer credit data, and article reservation data.

22. The system as recited in claim 15 which further comprises:

collection means for receiving a payment from a customer;

refunding means for dispensing a refund to a customer; and printout means for providing a customer with transaction information.

23. The system as recited in claim 15 in which said computer control and record keeping means is programmed to:

a) control rental transaction activity;

b) calculate and display rental time and charges on said first monitor means;

c) maintain records of all transactions;

d) maintain current inventory of articles, and status of each article; and e) calculate statistical data for transaction activity.

24. An unattended system for vending articles to authorized customers comprising:

a) article storing unit having a plurality of bins for storing respective articles, each one of said bins having i) a remotely operated solenoid lock for releasing articles from said bin for rental, ii) an indicator for indicating an available article stored in said bin;

b) an operating terminal having i) a first keyboard for entering, by an identified customer, of requests for information about said articles, and customer data, ii) card reading and writing means for reading a customer identification card, and for recording customer entered data thereon, iii) a first monitor for displaying information about said articles, and iv) cash and check acceptance box for receiving customer payments, c) a selection terminal having i) a second keyboard for entering, by an identified customer, identification of articles to be vended, ii) a second monitor for displaying information about selected articles, and iii) a card reader and writer for obtaining customer information, and recording keyboard entered information;

d) a computer connected to said operating terminal and said selection terminal for verifying authorization of said customer identification card, for producing a record of the identity of such authorized customer, for sending said information to said first and second monitors and for receiving data from said first and second keyboards; and e) at least one control module connected to said computer, and having control lines connected to each of said remotely operated solenoid locks, said computer directing said control module to unlock a bin selected by a customer.

* * * * *